(12) United States Patent
Wichern

(10) Patent No.: US 6,703,886 B2
(45) Date of Patent: Mar. 9, 2004

(54) CIRCUIT ARRANGEMENT FOR RECTIFYING A SIGNAL

(75) Inventor: Andreas Wichern, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/227,205

(22) Filed: Aug. 23, 2002

(65) Prior Publication Data

US 2003/0042964 A1 Mar. 6, 2003

(30) Foreign Application Priority Data

Aug. 28, 2001 (DE) .......................................... 101 42 022

(51) Int. Cl.[7] ................................................ H03L 5/00
(52) U.S. Cl. ........................ 327/330; 363/125; 363/126
(58) Field of Search ................................. 327/330, 531, 327/533; 363/125, 126, 127

(56) References Cited

U.S. PATENT DOCUMENTS

| | | | | |
|---|---|---|---|---|
| 3,353,106 A | * | 11/1967 | Dudek et al. .................. | 327/77 |
| 4,187,537 A | * | 2/1980 | Avicola ....................... | 363/127 |
| 4,219,745 A | * | 8/1980 | Hersman ..................... | 327/310 |
| 5,473,529 A | * | 12/1995 | Bohme ........................ | 363/127 |
| 5,721,507 A | * | 2/1998 | Fujii et al. .................. | 327/354 |

* cited by examiner

*Primary Examiner*—Tuan T. Lam
(74) *Attorney, Agent, or Firm*—Aaron Waxler

(57) ABSTRACT

In a circuit arrangement for rectifying a signal, in which two transconductors are controllable with opposite phase by means of the signal to be rectified, the outputs of the transconductors are connected to a first circuit point via a first diode and to a second circuit point via a second diode having an opposite polarity with respect to the first diode. The circuit points are connected to a predetermined potential. A rectified signal can be derived from at least one of the circuit points.

4 Claims, 2 Drawing Sheets

CIRCUIT ARRANGEMENT FOR RECTIFYING A SIGNAL

The invention relates to a circuit arrangement for rectifying a signal, in which two transconductors are controllable with opposite phase by means of the signal to be rectified.

In electronic devices, for example, in radio receivers, it is often necessary to gain information about the amplitude of a signal changing its sign (alternating voltage), either for driving controllers which react to the amplitude, or for regaining (demodulation) the information content from a received signal. This is usually effected by means of active rectifier circuits.

It is known from, for example, U.S. Pat. No. 5,721,507 to arrange two transistors in parallel in one branch of a differential amplifier, which transistors are impressed, in phase opposition, with the signal to be rectified. Dependent on the sign of the signal to be rectified, one or the other of the parallel arranged transistors is turned on. Due to the curvature of the base-emitter characteristic curve, disturbing non-linearities are produced for small amplitudes of the applied signal. These non-linearities are avoided in a full-wave rectifier circuit as described in DE 30 12 823, in which the phase-opposed signals to be demodulated are first amplified in a respective transconductor and then applied from the outputs of the transconductors to a resistor via a respective diode. One of the diodes is then conducting in dependence upon the sign of the signal to be rectified. However, it cannot be avoided that one of the output transistors of that transconductor which is connected to the blocked diode reaches its saturation state. This state is particularly detrimental in an integrated circuit because current flows into and out of the substrate and the relevant transistor gets out of its saturation state only with a delay. The behavior of the known full-wave rectifier circuit at higher frequencies is thereby non-linear.

It is an object of the present invention to provide a circuit arrangement for rectifying a signal, which operates accurately through a large frequency range and supplies a linear output signal.

According to the invention, this object is solved in that the outputs of the transconductors are connected to a first circuit point via a first diode and to a second circuit point via a second diode having an opposite polarity with respect to the first diode, in that the circuit points are connected to a predetermined potential, and in that a rectified signal can be derived from at least one of the circuit points.

The circuit arrangement according to the invention is basically suitable for differential signals, i.e. signals which are pairwise phase-opposed, as well as for signals to ground. The phase opposition in the control of the transconductors can be achieved in that two phase-opposed signals are applied to equal inputs of the transconductors, or that equally phased signals are applied to opposite inputs of the two transconductors. The predetermined potential can be chosen by those skilled in the art in such a way that, starting therefrom, a control in both directions is possible, i.e. the predetermined potential is approximately in the middle of the control range of the transconductors. Moreover, the relevant predetermined potential should be chosen for the first and the second circuit point in such a way that there is a smooth transition between the diodes.

In a first advantageous embodiment of the circuit arrangement according to the invention, the rectified signal can be advantageously gained as voltage signal in that at least one of the circuit points is connected to the predetermined potential via a current input of a current/voltage converter, whose output constitutes the output of the circuit arrangement. The current/voltage converter is advantageously constituted by a current mirror circuit.

In a second embodiment, a voltage signal is gained in that at least one of the circuit points is connected to the predetermined potential via a resistor and constitutes an output of the circuit arrangement.

These and other aspects of the invention are apparent from and will be elucidated with reference to the embodiments described hereinafter.

Figure 1:
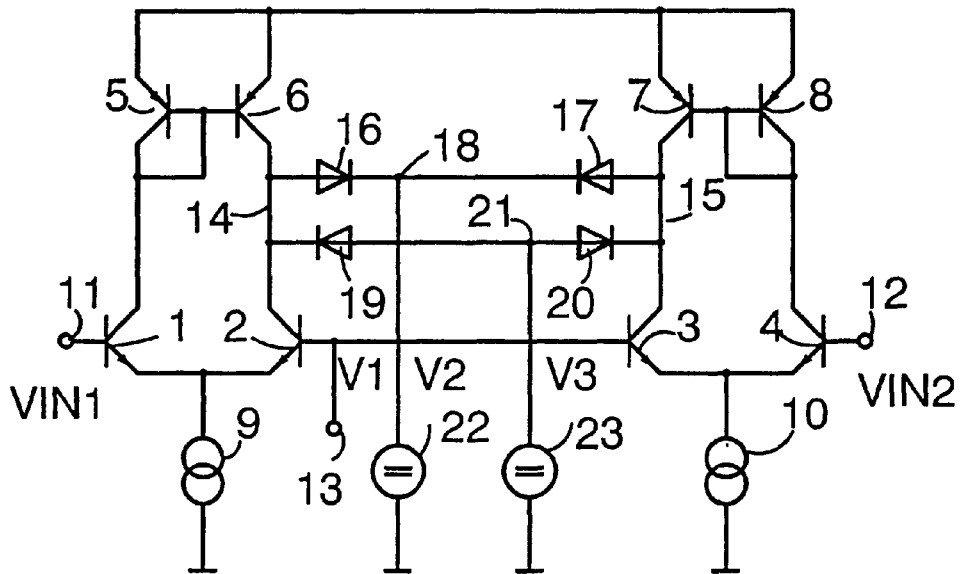
FIG. 1 shows a first embodiment.
Figure 3:
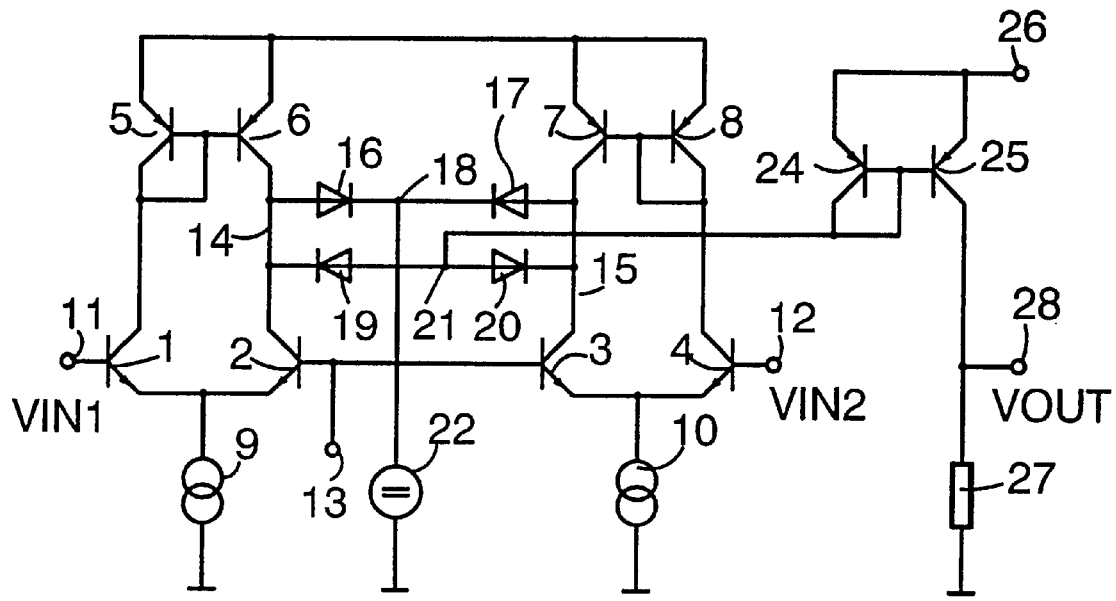
FIG. 3 shows a second embodiment.
Figure 4:
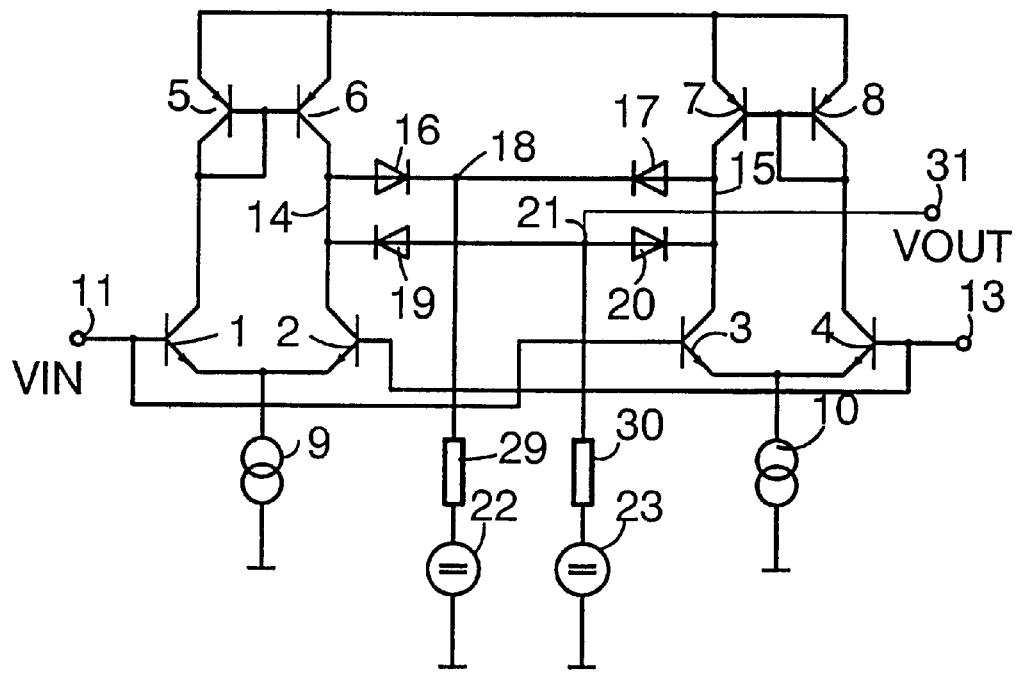
FIG. 4 shows a third embodiment.

The embodiments shown in FIGS. 1, 3 and 4 comprise two transconductors. A first transconductor comprises a differential amplifier which is constituted by the transistors 1, 2 and a current source 9, and a current mirror circuit which is constituted by the transistors 5 and 6. Similarly, a second transconductor is constituted by the transistors 3, 4, a current source 10 and further transistors 7, 8. Those skilled in the art can realize the transconductors with other suitable amplifying components such as, for example, field effect transistors or tubes.

To elucidate the basic function of the circuit arrangement according to the invention, the way in which a voltage output signal is derived is not shown in detail in the embodiment shown in FIG. 1.

In the embodiments shown in FIGS. 1 and 3, the signal to be rectified is applied via inputs 11 and 12 to the bases of the transistors 1 and 4. The bases of the transistors 2 and 3 are connected to a reference potential V1 which is supplied at 13. The amplified signals can be derived from the outputs 14, 15 of the transconductors. These outputs are connected to a first circuit point 18 via a respective diode 16, 17 and to a second circuit point 21 via a respective diode 19, 22 with opposite polarity. The circuit points 18, 21 are at a constant potential V2, V3 in FIG. 1, which is indicated by the DC source symbols 22 and 23. Circuit details for realizing a constant potential are known per se and do not need any explanation in connection with the circuit arrangement according to the invention.

The rectified signal is thus present as a current signal. When the signal is changed, it is ensured in both directions that a current can flow from the outputs 14, 15 into the voltage sources 22, 23. When correctly choosing the potentials V2, V3 within the output characteristic curve of the transconductors, a linear amplification and a linear rectification are thereby ensured, particularly also because the transistors 6, 7 are not driven into saturation.

Figure 2:
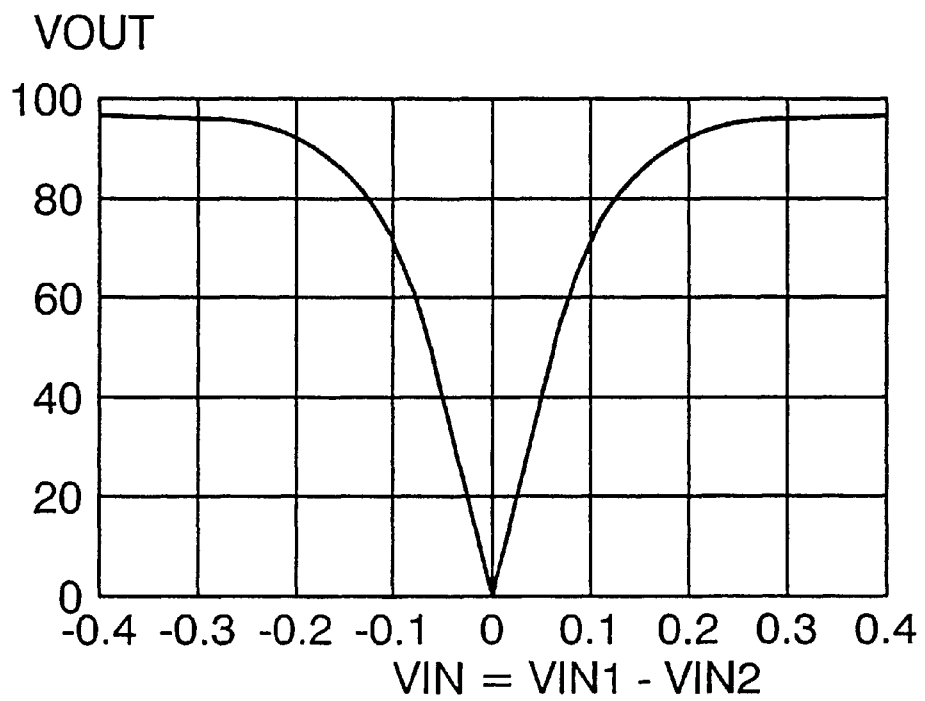
FIG. 2 shows a characteristic curve or a circuit arrangement according to the invention.

FIG. 2 shows diagrammatically the rectifier characteristic curve of a circuit arrangement according to the invention at an alternating voltage VIN=VIN1−VIN2 through an amplitude range of −0.4 to +0.4, in which the output signal VOUT is only indicated in relative values. The Figure shows that a linear variation of the characteristic curve is already present also for very small amplitudes about zero. Dependent on the requirements imposed on the linearity, such a circuit arrangement can then be operated up to output amplitudes of 40%, 60% or 70%.

In the embodiment shown in FIG. 3, a conversion of the signal present as a current signal at the circuit point 21 is performed with the aid of a current/voltage converter which is formed as a current mirror circuit with the transistors 24, 25 and an operating resistor 27. The rectified signal can then be taken from the output 28. A predetermined potential corresponding approximately to the potential V2 (FIG. 1) should be applied to the connection 26.

The output signal of the circuit arrangement shown in FIG. 2 is not present as a differential signal, in contrast to the input signal to be rectified, but as a signal to ground. If a differential signal were required for further processing, the circuit arrangement of FIG. 3 could be supplemented by a further current/voltage converter connected to the circuit point 18.

In the circuit arrangement according to FIG. 4, a voltage signal is generated at the output 31 in that a resistor 30 is inserted between the circuit point 21 and the voltage source 23, which resistor has a value which is high enough to generate a usable voltage signal but not high enough to drive the transistor 7 into saturation. For reasons of symmetry, a further resistor 29 is provided. Here again, a further output (not shown) can be taken from the circuit point 18.

While differential input signals should be applied to the circuit arrangement shown in FIGS. 1 and 3, the circuit arrangement shown in FIG. 4 is designed for an input signal to ground. This signal is applied via the input 11 to the transistors 1, 3, while the bases of the transistors 2, 4 are connected to the reference potential V1 which is applied to an input 13.

What is claimed is:

1. A circuit arrangement for rectifying a signal, in which two transconductors are controllable with opposite phase by means of the signal to be rectified, characterized in that the outputs of the transconductors (1 to 10) are connected to a first circuit point (18) via a first diode (16, 17) and to a second circuit point (21) via a second diode (19, 20) having an opposite polarity with respect to the first diode, in that the circuit points are connected to a predetermined potential, and in that a rectified signal is derived from at least one of the circuit points.

2. A circuit arrangement as claimed in claim 1, characterized in that at least one of the circuit points (21) is connected to the predetermined potential via a current input of a current/voltage converter (24, 25, 27), whose output constitutes the output of the circuit arrangement.

3. A circuit arrangement as claimed in claim 1, characterized in that the current/voltage converter is constituted by a current mirror circuit (24, 25).

4. A circuit arrangement as claimed in claim 2, characterized in that at least one of the circuit points (18, 21) is connected to the predetermined potential via a resistor (29, 30) and constitutes an output (31) of the circuit arrangement.

* * * * *